(12) United States Patent
Kadar-Kallen (10) Patent No.: US 8,675,284 B2
(45) Date of Patent: Mar. 18, 2014

(54) TRUNCATED BALL LENS FOR AN EXPANDED BEAM CONNECTOR

(75) Inventor: Michael Aaron Kadar-Kallen, Harrisburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 163 days.

(21) Appl. No.: 13/114,278

(22) Filed: May 24, 2011

(65) Prior Publication Data

US 2012/0300312 A1  Nov. 29, 2012

(51) Int. Cl.
*G02B 3/00* (2006.01)
*G02B 9/00* (2006.01)
*G02B 13/18* (2006.01)
*G02B 3/02* (2006.01)

(52) U.S. Cl.
USPC .......................................... 359/664; 359/718

(58) Field of Classification Search
USPC ......................................... 359/664, 642, 718
See application file for complete search history.

(56) References Cited

U.S. PATENT DOCUMENTS

| 4,830,454 | A | 5/1989 | Kartensen |
| 5,037,199 | A | 8/1991 | Hlousek |
| 5,311,611 | A | 5/1994 | Migliaccio |
| 7,185,845 | B1 | 3/2007 | Hartman et al. |
| 2004/0165824 | A1 | 8/2004 | Kaneko |
| 2008/0050073 | A1 | 2/2008 | Kadar-Kallen et al. |

FOREIGN PATENT DOCUMENTS

| GB | 1141779 A | 1/1969 |
| JP | 2003167159 A | 6/2003 |
| WO | 2005002004 A2 | 1/2005 |

OTHER PUBLICATIONS

International Search Report, International Application No. PCT/US2012/038753, International Filiing Date May 21, 2012.

*Primary Examiner* — Alicia M Harrington

(57) ABSTRACT

Disclosed is a truncated ball lens, and method of making same, in which a ball lens, having a focal point internal to (i.e., inside of) the ball lens, is constructed by removing a surface of the ball lens so as to expose the focal point. The exposed side of the truncated ball lens faces the endface of a fiber directing light towards the lens. In a preferred embodiment, an optical axis of the truncated ball lens coincides with an optical axis of the fiber.

4 Claims, 6 Drawing Sheets

TRUNCATED BALL LENS FOR AN EXPANDED BEAM CONNECTOR

FIELD OF THE INVENTION

The present invention relates generally to lenses, and, more specifically, to ball lenses used in an expanded beam optical connector.

BACKGROUND OF THE INVENTION

Optical fiber connectors are a critical part of many different light transmission systems. For example, they are found in essentially all optical fiber communication systems and they are used in imaging light onto targets in military applications. Such connectors may be used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

Of particular interest herein are "expanded beam" optical connectors. Such connectors are used traditionally in high vibration, high power and/or dirty environments, where "physical contact" between the fiber and the light path of a mating connector is problematic. To avoid problems of debris and vibration, expanded beam optical connectors have been developed which expand the optical beam and transmit it over an air gap between the connectors. By expanding the beam, its relative size increases with respect to the debris, making it less susceptible to interference. Further, transmitting the beam over an air gap eliminates component-to-component wear, thereby increasing the connector's endurance to vibration. Over the years, the expanded beam connector has evolved into a ruggedized multi-fiber connector comprising an outer housing which is configured to mate with the outer housing of a mating connector, typically through a screw connection. Contained within the outer housing are a number of inner assemblies or "inserts." Each insert typically comprises an insert housing, a ferrule assembly contained within the insert housing and adapted to receive a fiber, and a ball lens at a mating end of the insert housing optically connected to the fiber.

The ball lens as an interface is particularly useful in military targeting. Such an application involves using a fiber to transmit light from a high power optical source (e.g., a laser) to an optical system which images the light onto a target. The ball lens interface is preferred because of the high power density of the light within the fiber. Expanding the beam reduces the power density at the separable interface, which reduces the probability of laser-induced damage caused by interaction of the laser with dirt and debris at the separable interface. In such an application, the laser wavelength is longer than the typical communication wavelength of approximately 1.31 µm to 1.55 µm.

Figure 1:
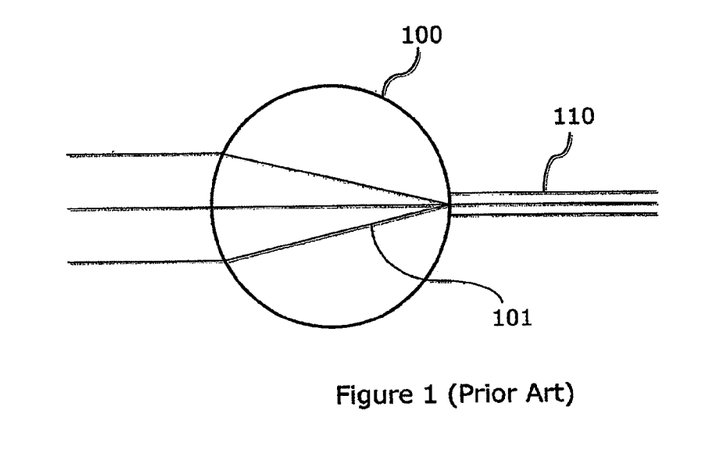
FIG. 1 illustrates a prior art ball lens.
Figure 2:
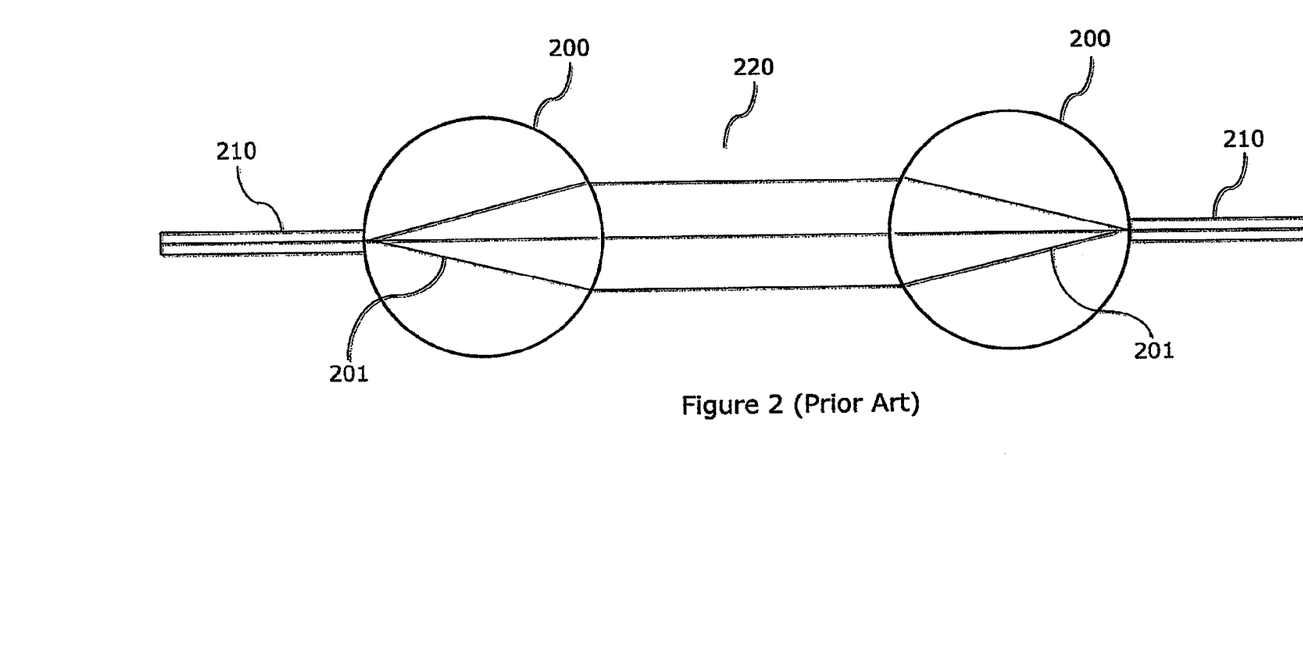
FIG. 2 illustrates the lens portions of two expanded beam connectors when they are mated to each other.

One such ball lens 100 is shown in FIG. 1 (for simplicity only the ball lens 100 and fiber 110 are shown; the insert housing and ferrule assembly of the outer housing are not shown). The ball lens 100 serves to expand and collimate light 101 at the connector interface as shown in FIG. 1. When two expanded beam connectors are mated (shown conceptually in FIG. 2), there is an air gap 220 between the ball lenses 200 of each pair of optically coupled inserts. As in FIG. 1, in FIG. 2 the ball lenses 200 serve to collimate light 102 being carried along fiber 210.

Tyco Electronics Corporation (Harrisburg, Pa.) manufactures expanded beam (EB) connectors using the PRO BEAM® trademark. These expanded beam connectors are for use at typical communications wavelengths such as 0.85 µm, 1.3 µm, 1.31 µm and 1.55 µm, where the first two wavelengths are often used in multimode (MM) applications and the second two wavelengths are used for singlemode (SM) applications. These EB connectors use a 3 mm ball lens to collimate and then refocus the light. A ball lens with an index of refraction of approximately 2 focuses collimated light near the surface of the ball. Therefore in the SM design, the lens material is chosen such that the index of refraction is nearly equal to 2 at 1.31 µM and 1.55 µm. For MM applications, a lens material is used which has an index of refraction less than 2, such that the focal plane is outside of, i.e., external to, the lens. In the MM EB connectors, the mechanical housing (referred to as an "EB insert") holds the fiber at a predetermined distance from the lens so that the fiber end is positioned at the external focal plane.

A ball lens can be easily manufactured with precise control of the diameter and the sphericity. Therefore the ball lens can be accurately located with respect to a fiber using passive alignment features that are built into the EB insert, using the mechanical characteristics of the ball/sphere shape, i.e., the geometry of a sphere provides a significant "registration surface" for use in positioning of a ball-shaped lens.

Figure 3:
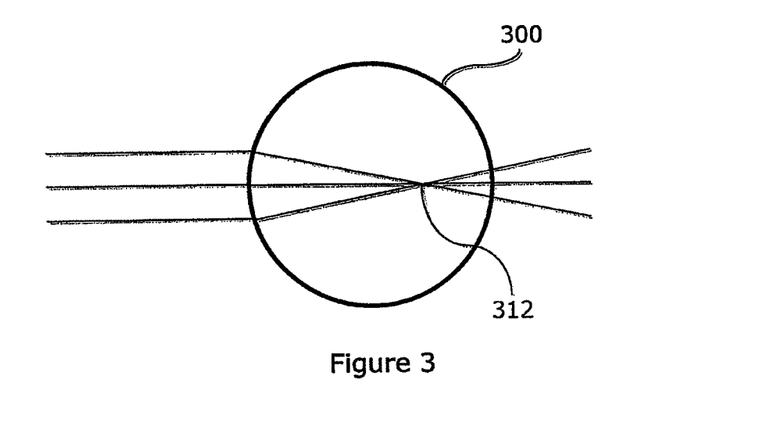
FIG. 3 illustrates the internal focusing of a focal point in a ball lens made of ZnSe or other material having an index of refraction greater than 2.

The above-described design functions quite well for typical communication wavelengths between 0.85 and 1.55 µm. However, situations arise where a particular application may require connectors that will function with higher wavelengths, such as in the military application described above, or in the near to mid-infrared wavelength range of 1.8 µm to 5 µm. This requires the use of a different glass than is used in the current EB connectors. One glass that is commonly used in infrared optics is zinc selenide (ZnSe), which can pass light in the infrared wavelengths. However, a problem exists when trying to use ZnSe for a ball lens: the index of refraction of ZnSe is greater than 2, and thus a collimated beam of light incident on a ball lens 300 made of ZnSe will focus the light to a point 312 inside of the ball, as illustrated in FIG. 3. Therefore, typical EB lens designs cannot be used as a collimating lens for an EB connector, and yet it is desirable to be able to use the mechanical alignment features of a ball lens. The present invention fulfills this need among others.

SUMMARY OF THE INVENTION

The claimed invention is a truncated ball lens in which a ball lens, having a focal point internal to (i.e., inside of) the ball lens, is constructed by removing a surface of the ball lens so as to expose the focal point. A surface on the exposed side of the truncated ball lens faces the endface of a fiber directing light towards the lens. In a preferred embodiment, an optical axis of the truncated ball lens coincides with an optical axis of the fiber.

In a preferred embodiment the ball lens is formed of ZnSe; however, it is understood that the ball lens can be formed of any material suitable for use in the infrared wavelengths, and having an index of refraction greater than 2. A surface of the ball lens is removed (e.g., by grinding, drilling, laser processing, and/or polishing) to "expose" the focal point. Such a truncated ball lens offers some of the advantages of a ball lens, such as the ability to position the lens accurately with respect to a fiber using the surface of the ball lens and passive features in an EB insert.

In a preferred embodiment, the fiber is in contact with the truncated ball lens, using the truncated ball lens as a mechanical stop for the fiber, i.e., the generally flat exposed surface of the ball lens coincides with the focal point of the truncated ball lens. However, other variations are possible; for example, in an alternative embodiment, additional material may be removed from the ball lens such that the focal point is beyond the exposed surface, i.e., outside of the truncated ball lens but within the area defined by the ball lens prior to the removal of the material. The fiber and truncated ball lens can then be held at a predetermined distance (e.g., using features in an EB insert), in a manner similar to that described above with respect to the standard multimode EB connector. Such a design allows for active alignment of the fiber-lens distance in the axial direction in order to optimize performance. The choice of which design to use is a tradeoff between the cost of active alignment and the accuracy and cost of the manufacture of the lens.

DETAILED DESCRIPTION

Figure 4:
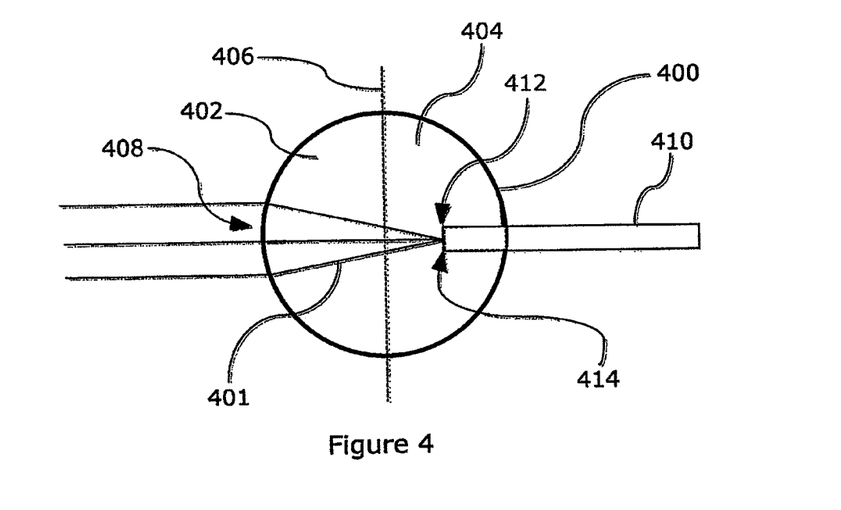
FIG. 4 illustrates, conceptually, the claimed invention.

FIG. 4 illustrates a concept of the present invention. In FIG. 4, a ball lens 400 is shown having a front area 402 and a rear area 404. A centerline 406 identifies the border between the front area 402 and the rear area 404. It is understood that the front area 402, rear area 404, and centerline 406 are not physically delineated areas per se but are instead identified as such for purpose of explaining and claiming the invention. The material comprising the front area 402 and the rear area 404 is one and the same material, divided by imaginary centerline 406.

In the ball lens of FIG. 4, the ball lens 400 is formed of a material having an index of refraction that is greater than 2. For example, the ball lens of FIG. 4 can be made of ZnSe. For the lens to transmit collimated light 401 at the surface 408 of a standard ball lens made of a material having an index of refraction that is greater than 2, a fiber 410 transmitting the light would have to be positioned such that it has an endface 412 at focal point 414; this would be impossible, however, since the focal point 414 is within the rear area 404 of the sphere defining ball lens 400. The claimed invention provides a solution to this problem. In accordance with the claimed invention, ball lens 400 is modified so as to enable placement of the endface 412 of fiber 410 at focal point 414. Various modifications are described more fully below.

In one embodiment, a hole large enough to accommodate fiber 410 is drilled into the ball lens 400, so that an opening is formed deep enough to enable the endface 412 of fiber 410 to be inserted up to focal point 414. This configuration would look essentially like the configuration of FIG. 4, since the ball lens 400 retains essentially its entire spherical shape except for the hole drilled to enable insertion of fiber 410. The hole can be drilled to a depth such that a flat surface of the ball lens 400 coincides with focal point 414. Alternatively, the hole can be drilled beyond focal point 414, and the fiber 410 can be inserted a distance such that the endface 412 of fiber 410 is stopped at a new focal point (not shown) which is calculable in a well known manner. (Removal of the ball lens material beyond focal point 414 will change the location of the focal point since a portion of light beam will be traveling through air or other light-transmissive media such as gel or adhesive, but a person of ordinary skill in the art can easily calculate this new focal point without undue experimentation.) In either case, a light transmitted through/carried by fiber 410 will result in a collimated light beam at the surface 408 of the front area 402 of ball lens 400 as shown in FIG. 4.

Figure 5A:
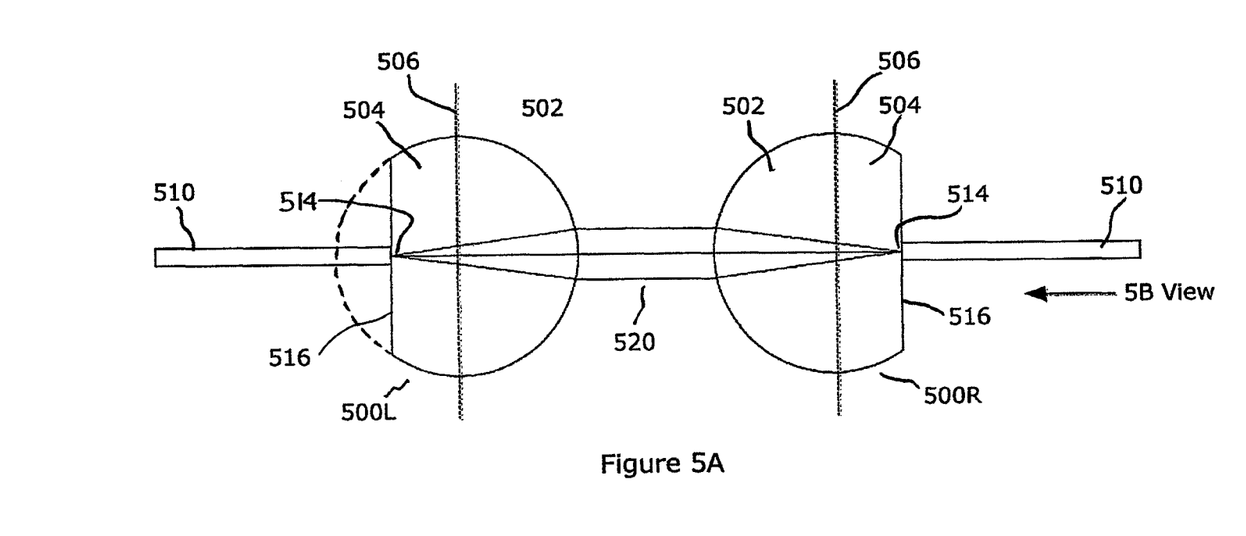
FIGS. 5A and 5B illustrate a preferred embodiment of the claimed invention.
Figure 5B:
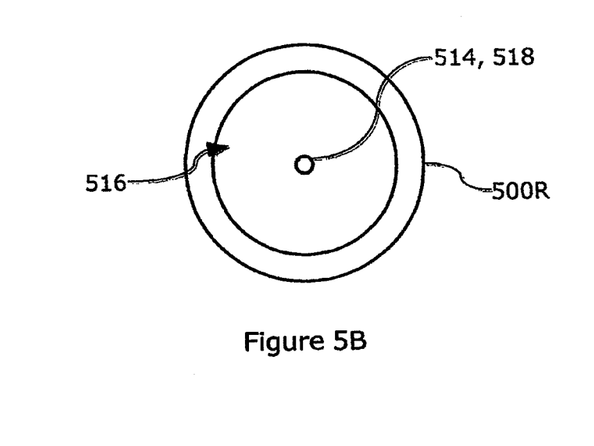

FIGS. 5A and 5B illustrate a preferred embodiment of the claimed invention. In this embodiment, a left ball lens 500L and a right ball lens 500R are separated by an air gap 520. Each ball lens has a front area 502 and a rear area 504, and the rear area 504 is polished, ground, cut, or otherwise formed such that a spherical cap is removed from the ball lens as shown. A centerline 506 identifies the border between the front area 502 and rear area 504. The grinding and polishing could be performed using an abrasive material. Cutting could be performed using a laser, diamond saw, or other known cutting means. Further, combinations of cutting, grinding, and/or polishing may be used to remove the portion of the ball lens.

In FIG. 5A, the removed spherical cap is illustrated in phantom using dotted lines in left ball 500L; right ball 500R shows the ball without the phantom lines. The spherical cap is dimensioned such that the focal point 514 is exposed at the face 516 of rear area 504. In a preferred embodiment, the exposed focal point 514 coincides with the centerpoint 518 of the circle defined by the removed spherical cap as shown in FIG. 5B, which is a side view of ball lens 500R. As with the embodiment illustrated in FIG. 4, in this embodiment the dimensions of the removed portion can be such that the exposed focal point 514 is not coincident with the face 516 but is instead within the rear area 504 but spaced apart from the face 516. The fiber 510 can then be positioned such that its endface 512 is coincident with the new exposed focal point (not shown, see explanation given in the description of FIG. 4), leaving an air gap (which can be filled with light transmissive gel, adhesive, etc.) between the fiber endface 512 and the new focal point.

Figure 6:
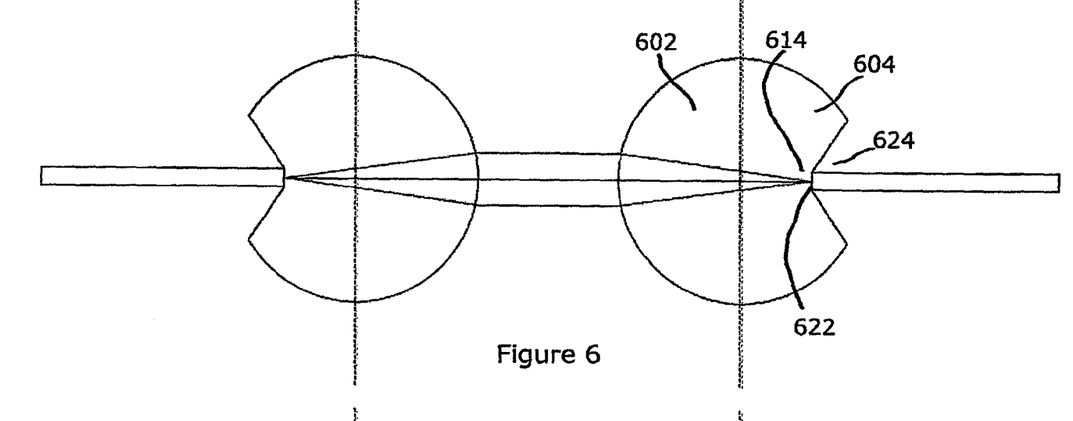
FIGS. 6 and 7 illustrate alternative embodiments of the claimed invention.
Figure 7:
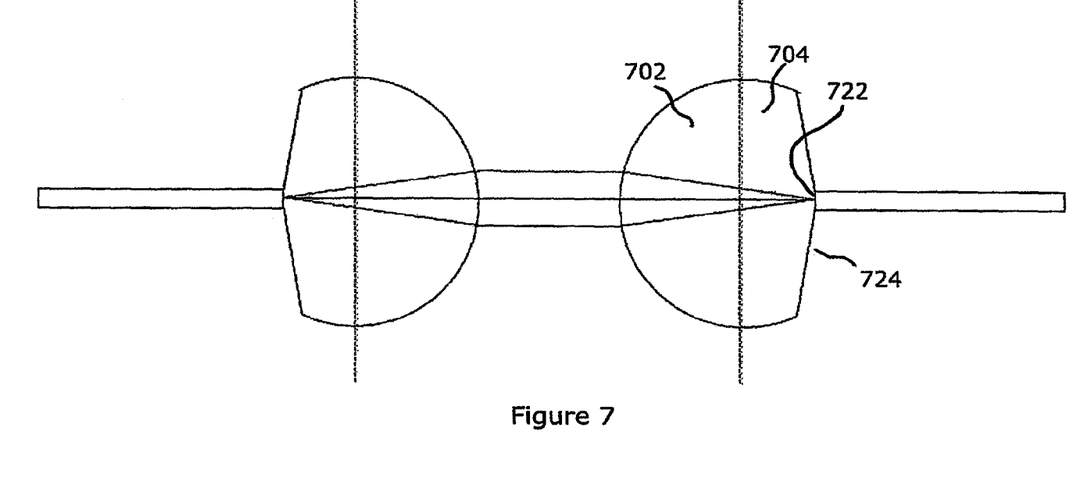

FIGS. 6 and 7 illustrate alternative embodiments of the present invention. In FIG. 6, the removed portion is a spherical cone 624, with a generally flat surface 622 formed at the apex of spherical cone 624, and the exposed focal point 614 coinciding with the apex at flat surface 622. In FIG. 7, the removal of the removed portion forms a conical surface 724 in the rear area 704 extending away from the front area 702, with a generally flat surface 722 being formed at the apex of the conical surface 724. In each case (FIG. 6 and FIG. 7) the generally flat surface can be formed closer to front area 602 or 702 such that a gap exists between the generally flat surface and the exposed focal point, as discussed similarly with respect to FIGS. 4 and 5.

Modeling confirms the excellent performance of the claimed invention. Specifically, modeling was performed in which it was assumed that the fiber is a step-index fiber with a numerical aperture (NA) of 0.3, and a core diameter of 100 µm. A 3 mm ZnSe ball lens was modeled. The distance from the fiber to the ball lens' curved surface and the distance between the two ball lenses were varied to optimize the performance at 1.8 µm and 5 µm. The result was that (ignoring reflection losses) the loss was 0.034 dB at both 1.8 µm and 5 µm.

Figure 8:
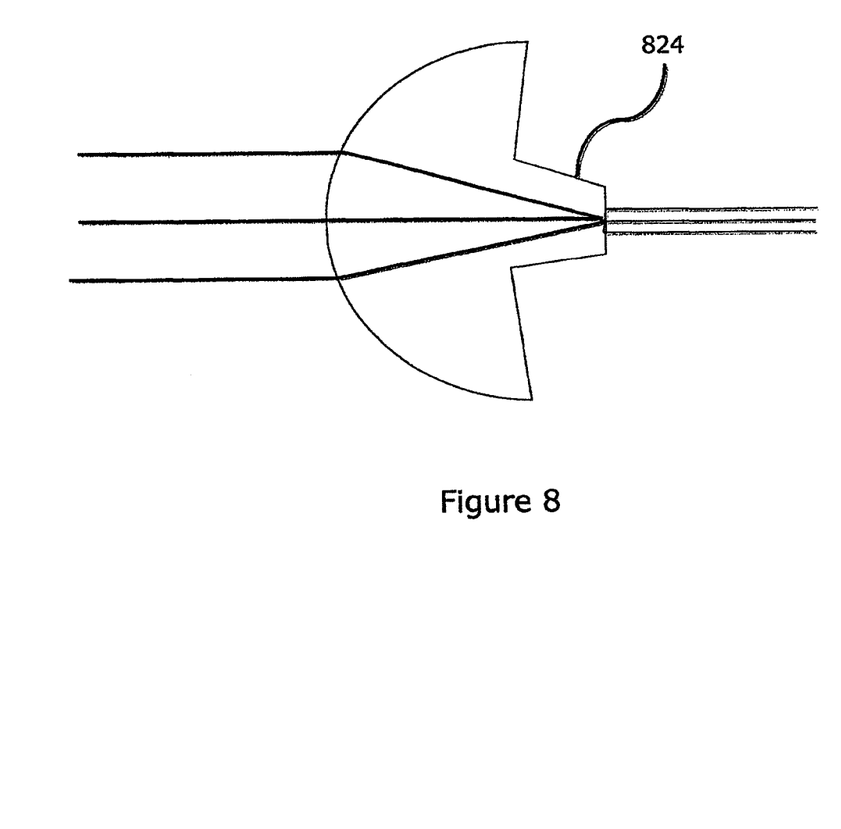
FIG. 8 illustrates another alternative embodiment of the claimed invention.

It is noted that the only parts of the lens which are needed to collimate and transmit the light are those through which light passes. Therefore the ball lens can be modified in any way that may be useful or necessary, so long as the optical path shown above is not affected. For example, one may choose to polish/grind/cut portions to the point where the cone shape is more pronounced as shown in FIG. 8. As can be seen, the light passes through the cone 824 in the example of FIG. 8 in approximately the same area as the light passing through the much shallower cone 724 of FIG. 7.

Figure 9A:
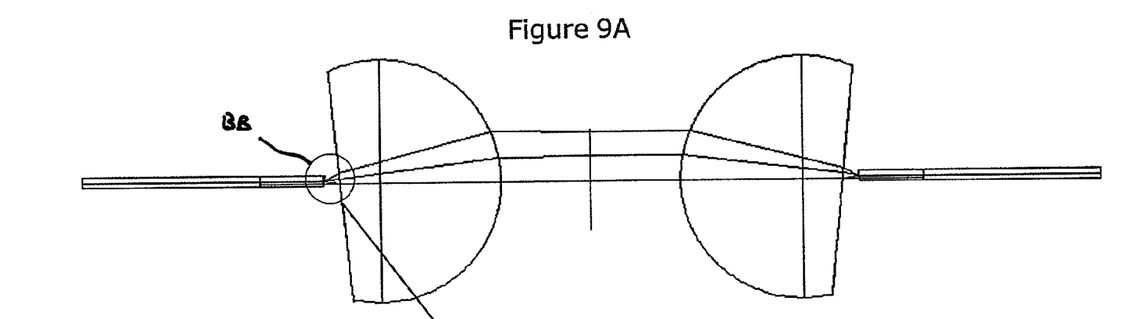
FIG. 9A illustrates another alternative embodiment of the claimed invention.
Figure 9B:
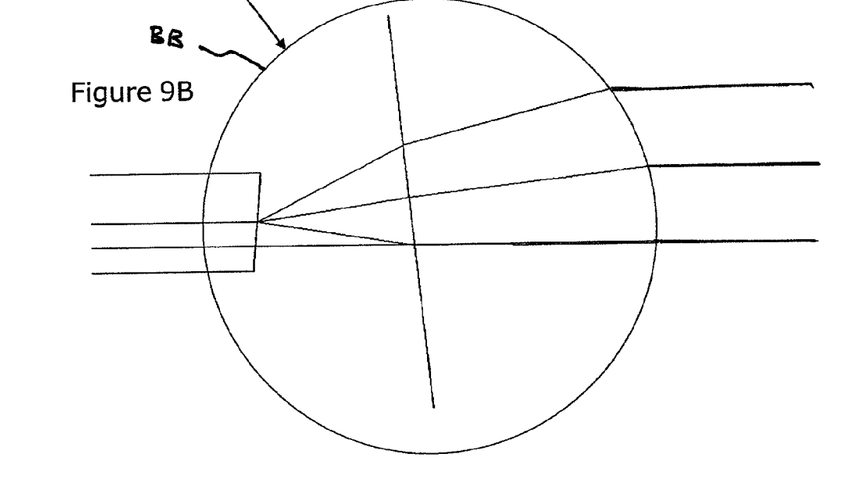
FIG. 9B illustrates an enlarged portion of FIG. 9A, designated by circle BB.

In the embodiments disclosed above, the fiber is cleaved or polished such that the endface of the fiber is perpendicular to the optical axis and the endface is parallel to the generally flat face of the truncated ball lens. However, it is understood that in another embodiment, the fiber can be cleaved or polished at an angle, such as 8°, in order to reduce back-reflections, and the ball can be oriented such that the flat face of the truncated ball is parallel to the angled endface of the fiber. Further, as shown in FIGS. 9A and 9B, the fiber can be cleaved on an angle and the portion of the rear area that is removed can be removed in such a way that the surface of the removed area is also angled, and the angled end face of the fiber does not need to be parallel to the angled surface of the truncated ball lens. In either of these embodiments, the fiber may be touching the ball, or there may be an air gap between the ball and the fiber (as shown in FIG. 9).

Further, although the portion where the focal point is exposed is referred to herein as comprising a "flat face," it is understood that this surface could instead be curved (convex or concave) and still fall within the scope of the claimed invention. In preferred embodiments, the general shape of the truncated ball lens is greater than one-half of a sphere, so as to take advantage of the mechanical properties of a sphere-shaped lens, particularly with regard to alignment of the lens. A fundamental element of the truncated ball lens of the present invention is that the area in which the light travels through the lens remains essentially intact. Thus, for example, the truncated ball lens shown in FIG. 8 could be modified by cutting out a wedge-shaped portion between the "10 o'clock" and "11 o'clock" position and/or between the "7 o'clock" and "8 o'clock" position and still fall within the scope of the claimed invention, as long as the wedge(s) did not impinge on the light path through the lens. Other embodiments may also be easily envisioned by one skilled in the art, such as the use of a fiber with a rounded tip, or an orientation of the endface of the fiber that is not parallel to the surface of the ball lens. Further, although the left and right lenses shown in FIGS. 5-9 are shown as being essentially identical, the different variations shown in FIGS. 5-9 may be mixed and matched, i.e., the left lens in FIG. 5 could be used with the right lens in FIG. 8.

It is also understood that the terms "planar" and "parallel" as used herein, including in the claims, include situations where the described element is substantially planar or substantially parallel, respectively. For example, when a fiber endface is cleaved or when a portion of the rear area is removed, it is understood that certain imperfections may cause a portion of the endface of the cleaved fiber, or the surface of the rear area after material is removed, to have curved edges, excess material or other imperfections. Such a surface is considered to be planar for the purpose of the claimed invention. Similarly, due to slight imperfections in alignment, elements are considered to be parallel for the purpose of the claimed invention even where the elements are slightly out of a purely parallel alignment, i.e., when they are substantially parallel.

In any of these designs, it is also understood that an anti-reflection (AR) coating may be added to the lens at the lens/air interfaces. For those designs where the fiber is in contact with the lens, an AR coating on the lens and/or fiber will be optimized for the fiber/lens interface. For those designs where the fiber is not in contact with the lens, the surface of the lens nearest the fiber can be AR coated for the lens/air interface, and the fiber can be coated for the fiber/air interface. In any of these designs, it may be desirable (due to cost, for example) to not AR coat one or more of the surfaces. However, optimal performance will be achieved when the surfaces are AR coated.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

The invention claimed is:

1. A truncated ball lens, comprising:
   a ball lens having a front area and a rear area, each of said front area and said rear area having a spherical surface and said rear area having a portion of ball lens material within said rear area removed; and
   a focal point located within said rear area of said ball lens; whereby:
   an end face of an optical fiber can be placed at said focal point, wherein:
   said portion of ball lens material comprises a shape other than a spherical cap,
      wherein said removed portion of said ball lens material is a spherical cone and wherein said focal point is exposed at the apex of said spherical cone.

2. A truncated ball lens, comprising:
   a ball lens having a front area and a rear area, each of said front area and said rear area having a spherical surface and said rear area having a portion of ball lens material within said rear area removed; and
   a focal point located within said rear area of said ball lens; whereby:
   an end face of an optical fiber can be placed at said focal point, wherein:
   said portion of ball lens material comprises a shape other than a spherical cap,
      wherein the removal of said removed portion of said ball lens forms a conical surface in said rear area extending away from said front area, said focal point being exposed at the apex of said conical surface.

3. A method of creating a truncated ball lens, comprising:
   taking a ball lens having a front area and a rear area, each of said front area and said rear area having a spherical surface, and removing a portion of ball lens material within said rear area; and
   exposing a focal point located within said rear area of said ball lens; whereby:
   an end face of an optical fiber can be placed at said focal point, wherein:

said portion of ball lens material comprises a shape other than a spherical cap,
  wherein said removed portion of said ball lens material is a spherical cone and wherein said focal point is exposed at the apex of said spherical cone.

4. A method of creating a truncated ball lens, comprising:
  taking a ball lens having a front area and a rear area, each of said front area and said rear area having a spherical surface, and removing a portion of ball lens material within said rear area; and
  exposing a focal point located within said rear area of said ball lens; whereby:
  an end face of an optical fiber can be placed at said focal point, wherein:
said portion of ball lens material comprises a shape other than a spherical cap,
  wherein the removal of said removed portion of said ball lens forms a conical surface in said rear area extending away from said front area, said focal point being exposed at the apex of said conical surface.

* * * * *